United States Patent
Beygi et al.

(10) Patent No.: US 10,825,264 B1
(45) Date of Patent: Nov. 3, 2020

(54) SYSTEMS AND METHODS FOR AIRPLANE MAINTENANCE

(71) Applicant: The Boeing Company, Chicago, IL (US)

(72) Inventors: Shervin Beygi, Seattle, WA (US); Brandi E. Fleming, Woodinville, WA (US); Darren B. Macer, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 396 days.

(21) Appl. No.: 15/941,233

(22) Filed: Mar. 30, 2018

(51) Int. Cl.
*G07C 5/00* (2006.01)
*B64F 5/00* (2017.01)

(52) U.S. Cl.
CPC ............... *G07C 5/006* (2013.01); *B64F 5/00* (2013.01)

(58) Field of Classification Search
CPC .................................. G07C 5/006; B64F 5/00
See application file for complete search history.

(56) References Cited

U.S. PATENT DOCUMENTS

| | | | |
|---|---|---|---|
| 4,742,476 A * | 5/1988 | Schwartz | F01M 11/10 123/196 S |
| 4,796,204 A * | 1/1989 | Inoue | F01M 11/10 123/196 S |
| 4,847,768 A * | 7/1989 | Schwartz | B60Q 9/00 701/29.5 |
| 4,943,919 A * | 7/1990 | Aslin | G07C 5/006 340/500 |
| 5,216,612 A | 6/1993 | Cornett et al. | |
| 6,418,361 B2 | 7/2002 | Sinex | |
| 8,452,475 B1 | 5/2013 | West et al. | |
| 9,251,502 B2 | 2/2016 | Schoonveld | |
| 2007/0112488 A1 | 5/2007 | Avery et al. | |
| 2007/0156496 A1 | 7/2007 | Avery et al. | |
| 2010/0100271 A1 | 4/2010 | Nagalla et al. | |
| 2016/0342930 A1 | 11/2016 | Tucker et al. | |
| 2017/0372000 A1 | 12/2017 | Ethington et al. | |

* cited by examiner

*Primary Examiner* — Richard M Camby
(74) *Attorney, Agent, or Firm* — Armstrong Teasdale LLP

(57) ABSTRACT

A computer device is provided. The computer device includes at least one memory and at least one processor in communication with the at least one memory. The at least one processor is programmed to receive a plurality of aircraft flight data associated with a plurality of aircraft and determine one or more non-operational gaps for each aircraft. The non-operational gap represents a series of consecutive non-operating days for the aircraft. The at least one processor is also programmed to compare the one or more non-operational gaps for the plurality of aircraft based on each aircraft's corresponding in-service date, detect a plurality of anchors in the plurality of aircraft flight leg data, compare the one or more non-operational gaps for the plurality of aircraft to the plurality of anchors, and determine a future maintenance event for a first aircraft based on the comparison.

20 Claims, 6 Drawing Sheets

SYSTEMS AND METHODS FOR AIRPLANE MAINTENANCE

BACKGROUND

The present disclosure relates generally to maintenance of aircraft, and more particularly to systems and methods for discovering when and how often airline operators ("carriers") perform aircraft heavy maintenance events.

When a carrier takes a delivery of an aircraft, the carrier is incentivized to operate the aircraft as much as possible to generate maximum revenues. Therefore the carrier keeps the aircraft's monthly usage at a relatively high level unless the carrier must take the aircraft out of service for heavy maintenance events (e.g., C and D checks). Heavy maintenance events usually keep aircraft out of service for two weeks or more.

Aircraft manufactures generally recommend heavy maintenance intervals to carriers. However carriers may modify the recommendations with the approval of their aviation authority. Moreover, carriers may change the heavy maintenance intervals due to airworthiness directives (AD) from aviation authorities over the life of their aircraft. Accordingly, maintenance intervals may vary from carrier to carrier and from one aircraft model to another aircraft model.

In addition, different carriers may use different indicators or metrics to determine when a maintenance event should be performed. For example, a first carrier may use a cumulative number of flight hours since a previous maintenance event as an indicator of when the next maintenance event should take place. A second carrier may use a number of flight cycles as an indicator, and a third carrier may use a total amount of time that has elapsed since the last maintenance event. Furthermore, a single carrier may use different types of indicators for different aircraft within the carrier's fleet. Generally, however, once a carrier has determined what indicator to use for a type of aircraft within the carrier's fleet, the carrier applies the indicator on all aircraft of the same type in its fleet.

Given the variations in how different carriers track and scheduled aircraft maintenance events, it is challenging for a maintenance, repair, and overhaul provider ("MRO") to predict maintenance events and obtain replacement aircraft components in preparation for the maintenance events. Accordingly, systems and methods that facilitate predicting when such maintenance events will occur are desired.

BRIEF DESCRIPTION

In one aspect, a computer device is provided. The computer device includes at least one memory and at least one processor in communication with the at least one memory. The at least one processor is programmed to receive a plurality of aircraft flight leg data associated with a plurality of aircraft and determine one or more non-operational gaps for each aircraft. A non-operational gap represents a series of consecutive non-operating days for the aircraft. The at least one processor is also programmed to compare the one or more non-operational gaps for the plurality of aircraft based on each aircraft's corresponding in-service date, detect a plurality of anchors in the plurality of aircraft flight leg data, compare the one or more non-operational gaps for the plurality of aircraft to the plurality of anchors, and determine a future maintenance event for a first aircraft based on the comparison.

In another aspect, a computer implemented method for discovering when and how often airline operators ("carriers") perform aircraft heavy maintenance events is provided. The method is implemented on a maintenance analysis (MA) computer device including at least one processor in communication with at least one memory device. The method includes receiving a plurality of aircraft flight leg data associated with a plurality of aircraft and determining one or more non-operational gaps for each aircraft. A non-operational gap represents a series of consecutive non-operating days for the aircraft. The method also includes comparing the one or more non-operational gaps for the plurality of aircraft based on each aircraft's corresponding in-service date, detecting a plurality of anchors in the plurality of aircraft flight leg data, comparing the one or more non-operational gaps for the plurality of aircraft to the plurality of anchors, and determining a future maintenance event for a first aircraft based on the comparison.

In yet another aspect, at least one non-transitory computer-readable storage media having computer-executable instructions embodied thereon is provided. When executed by at least one processor, the computer-executable instructions cause the at least one processor to receive a plurality of aircraft flight leg data associated with a plurality of aircraft and determine one or more non-operational gaps for each aircraft. A non-operational gap represents a series of consecutive non-operating days for the aircraft. The computer-executable instructions also cause the at least one processor to compare the one or more non-operational gaps for the plurality of aircraft based on each aircraft's corresponding in-service date, detect a plurality of anchors in the plurality of aircraft flight leg data, compare the one or more non-operational gaps for the plurality of aircraft to the plurality of anchors, and determine a future maintenance event for a first aircraft based on the comparison.

Figure 1:
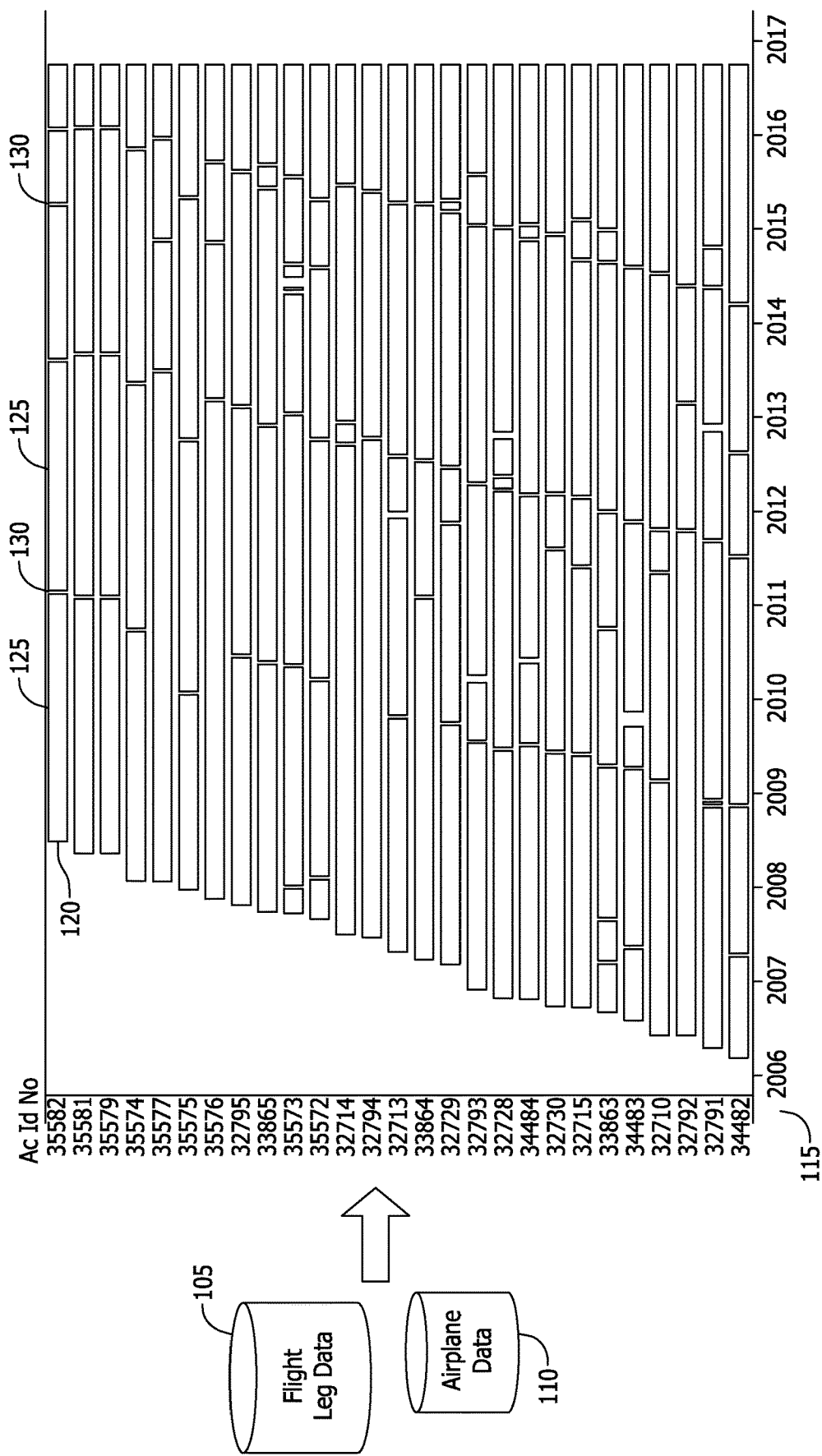
FIG. 1 illustrates a block diagram of converting flight leg data in accordance with one embodiment of the disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

The described embodiments enable analysis of flight data for potential maintenance events. More particularly, the present disclosure is directed to for discovering when and how often airline operators ("carriers") perform aircraft heavy maintenance events.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only and thus, are not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 illustrates a block diagram of converting aircraft flight leg data 105 (e.g. aircraft operation data) in accordance with one embodiment of the disclosure. In the exemplary embodiment, flight leg data 105 is used for analysis. In the exemplary embodiment, flight leg data 105 includes information about the operation of each aircraft in a fleet of aircraft. This may include data that is captured by one or more sensors aboard the corresponding aircraft, such as, but is not limited to, start-up time, start-up sequence logs, shutdown time, shutdown sequence logs, flight speed, engine speed, engine revolutions per minute, engine vibration, and/or data from the aircraft's avionics. In some embodiments, the aircraft transmits messages with some or all of this data directly to the aircraft manufacturer or other group for storage in a database as flight leg data 105. In other embodiments, this may be data collected from public sources, such as public flight databases. In some embodiments, flight leg data 105 is combined with the airplane data 110, which includes information about each individual aircraft in the plurality of aircraft, such as, but not limited to, aircraft delivery date or in-service date (the date that the individual aircraft began service), aircraft serial number, aircraft model, aircraft geographic region, and/or any other information about the individual aircraft used to perform the steps described herein.

In some embodiments, flight leg data 105 contains data for all or a majority of airplanes for a single carrier or airline. In other embodiments, flight leg data 105 contains data for all aircraft of a specific type, such as all dual-prop commuter aircraft or all quad jet engine long haul aircraft, or of a specific model. In some further embodiments, flight leg data 105 is sorted and/or filtered by one of model or aircraft type.

In the exemplary embodiment, flight leg data 105 is used to generate a flight leg graph 115. The x-axis for flight leg graph 115 is the date. The y-axis for flight leg graph 115 is an aircraft identifier. The flight leg graph 115 illustrates for each aircraft whether or not that aircraft was in operation on that particular day. In the exemplary embodiment, MA server 510 (shown in FIG. 5) uses the flight leg data 105 to determine whether or not each individual aircraft was in operation on a particular day. In some embodiments, MA server 510 compares the number of departures for aircraft in that fleet. In other embodiments, MA server 510 only considers an aircraft to be in operation if the aircraft operates for a certain period of time that day. For example, in some maintenance operations, aircraft are operated to perform measurements, such as test engine start-ups and test flights. To account for this testing, MA server 510 may only consider days where the aircraft was in operation over a predetermined period of time to count as an operational day. In flight leg graph 115, each row 120 represents a different aircraft. In each row 120, operational days 125 are marked and non-operational days 130 (e.g. gap days) are blank.

Figure 2:
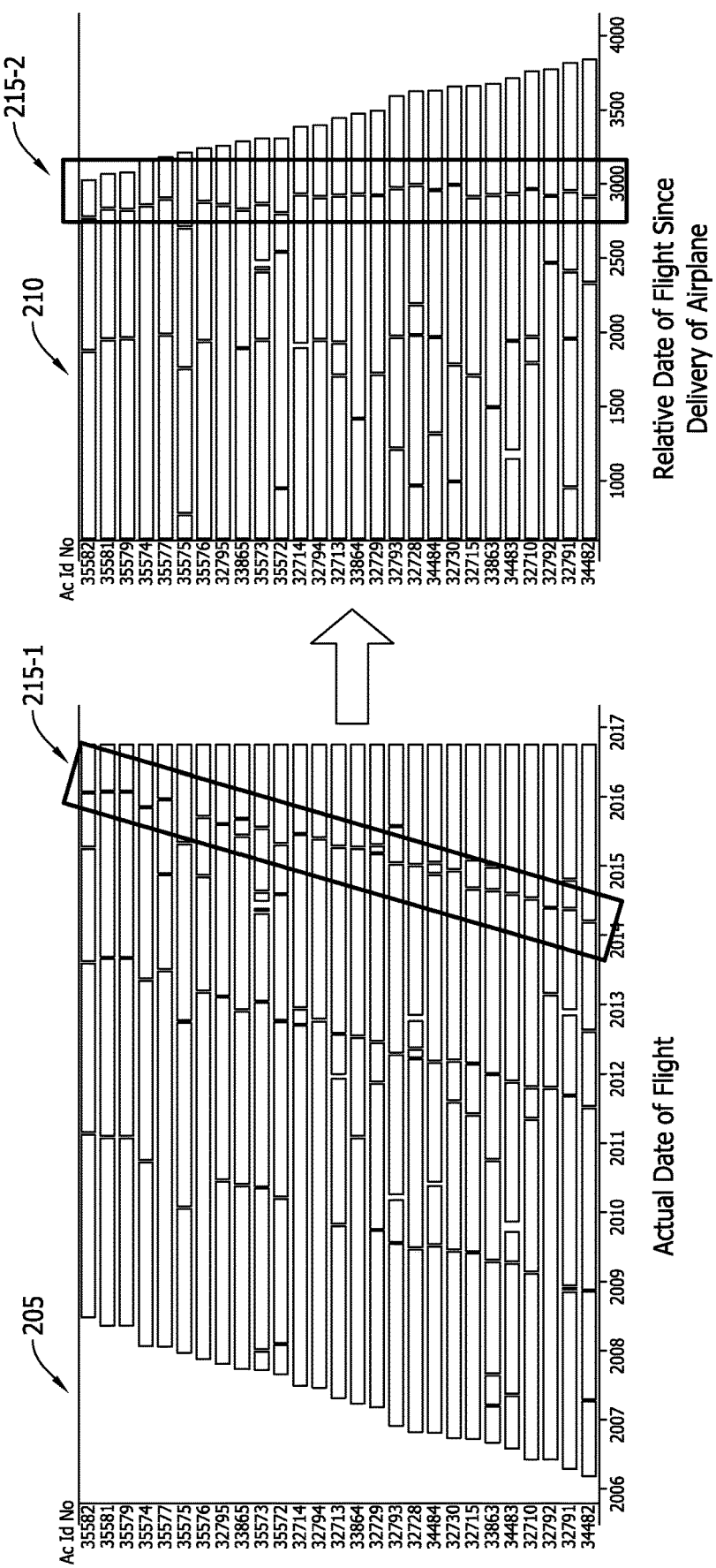
FIG. 2 illustrates a block diagram of analyzing flight data for potential maintenance events in accordance with one embodiment of the disclosure.

FIG. 2 illustrates a block diagram of analyzing flight data for potential maintenance events in accordance with one embodiment of the disclosure. FIG. 2 illustrates the adjustment of the operational and non-operational days based on delivery date of the individual aircraft, also known as in-service date. As shown in the actual date graph 205, the rows for each individual aircraft are blank prior to that aircraft's delivery date or in-service date. The manufacturing time and subsequent delivery time of aircraft varies for each aircraft based on model, type, location, line, and other factors. To account for this, MA server 510 replaces actual dates with number of days since the in-service date. As shown in FIG. 2, the actual date graph 205 shows the operational and non-operational dates for each aircraft on each individual day. The relative date graph 210 shows the operation and non-operational days for each aircraft relative that aircraft's delivery date or in-service date.

As seen in these two graphs 205 and 210, patterns of non-operation may appear, such as gaps 215-1 and 215-2. While in graph 205 gap 215-1 is at an angle and hard to read, in graph 210 gap 215-2 is a relatively straight line around the 3000 day mark. Accordingly, by analyzing the flight leg data 105 (shown in FIG. 1), MA server 510 is able to determine that there is a non-operational gap for each aircraft around 3000 days since the aircraft's delivery date.

Figure 3:
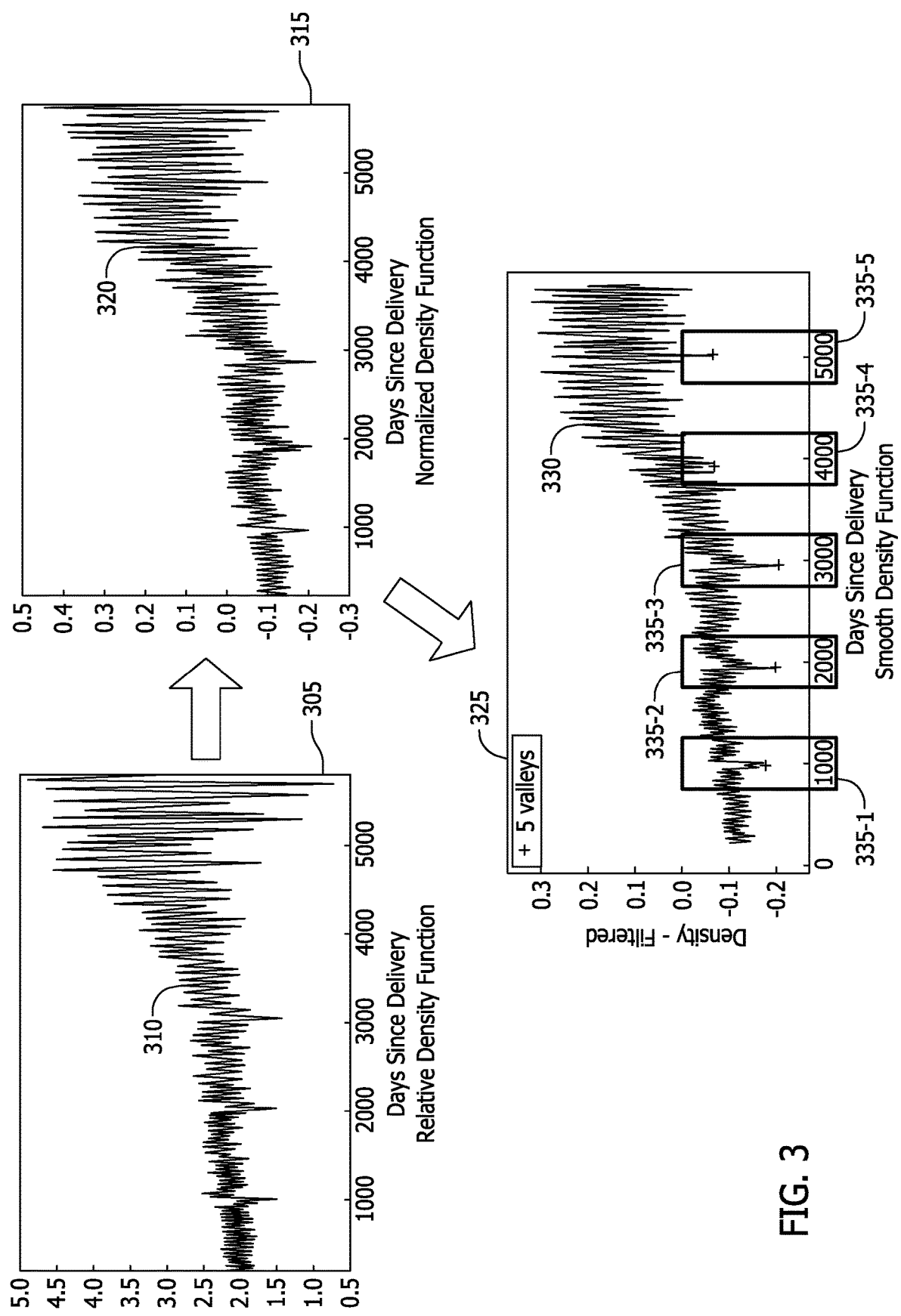
FIG. 3 illustrates a block diagram of detecting anchors in flight data in accordance with one embodiment of the disclosure.

FIG. 3 illustrates a block diagram of detecting anchors in flight data in accordance with one embodiment of the disclosure. The first graph 305 illustrates a relative density function 310, the second graph 315 illustrates a normalized density function 320, and the third graph 325 illustrates a smooth density function 330. In the exemplary embodiment, the relative density function is calculated by the MA server 510 (shown in FIG. 1). In this embodiment, the MA server 510 converts the relative density function 310 to the normalized density function 320 and then applies smoothing techniques to generate the smooth density function 330

In the exemplary embodiment, the relative density function 310 is calculated using the flight leg data 105 (shown in FIG. 1) for all of the planes or all planes of a specific type for an individual carrier. In the exemplary embodiment, the relative density function is:

$$\text{Relative Density at Time } t = \frac{\text{Total Number of Airplane Departures at Time } t}{\text{Total Number of Airplanes in the Fleet}}$$

where t is the number of days since delivery. The relative density function 310 compares the number of airplane departures to the number of airplanes available. For example, on day 2500 there were 27 active airplanes and 25 departures; therefore, the density for day 2500 is 0.926. In another example, on day 3000 there were 27 active aircraft, but only 19 departures; therefore, the relative density for that day is 0.704. In a third example, on day 3500 there were 11 active aircraft and 12 departures. As shown above, in some situations, there may be more departures than aircraft due to certain aircraft having multiple departures. In other embodiments, the relative density function 310 is based on the number of active aircraft or the number of aircraft with flight time on a particular day.

Next, the relative density function 310 is normalized. The normalized density function 320 is:

$$\text{Normalized Density at Time } t = \frac{\text{Density Function at time } t - \text{Average Density for all days}}{\text{Standard Deviation of Density for all days}}$$

Then the normalized density function 320 is smoothed. In the exemplary embodiment, a seven day moving average function is used to remove the impact of unscheduled events. This dampens the impact of unscheduled flight gaps, but recurring gaps stay. If there is a significant recurring gap in flight leg data 105, then the smooth density function 330 should show a valley. Other techniques for smoothing include, but are not limited to, moving average, weighted moving average, and exponential smoothing.

By analyzing the smoothed density function, MA server 510 is able to detect one or more valleys in the data, also known as anchors 335-1 through 335-5. The anchors represent a time when a significant majority of the aircraft were non-operational. As shown in the third graph 325, there are five anchors 335-1, 335-2, 335-3, 335-4, and 335-5. One anchor is around each 1000 day mark (i.e., anchor 335-2 is around the 2000 day mark). In other embodiments or with other data sets, the anchors 335-1 through 335-5 may be at different day marks.

Figure 4:
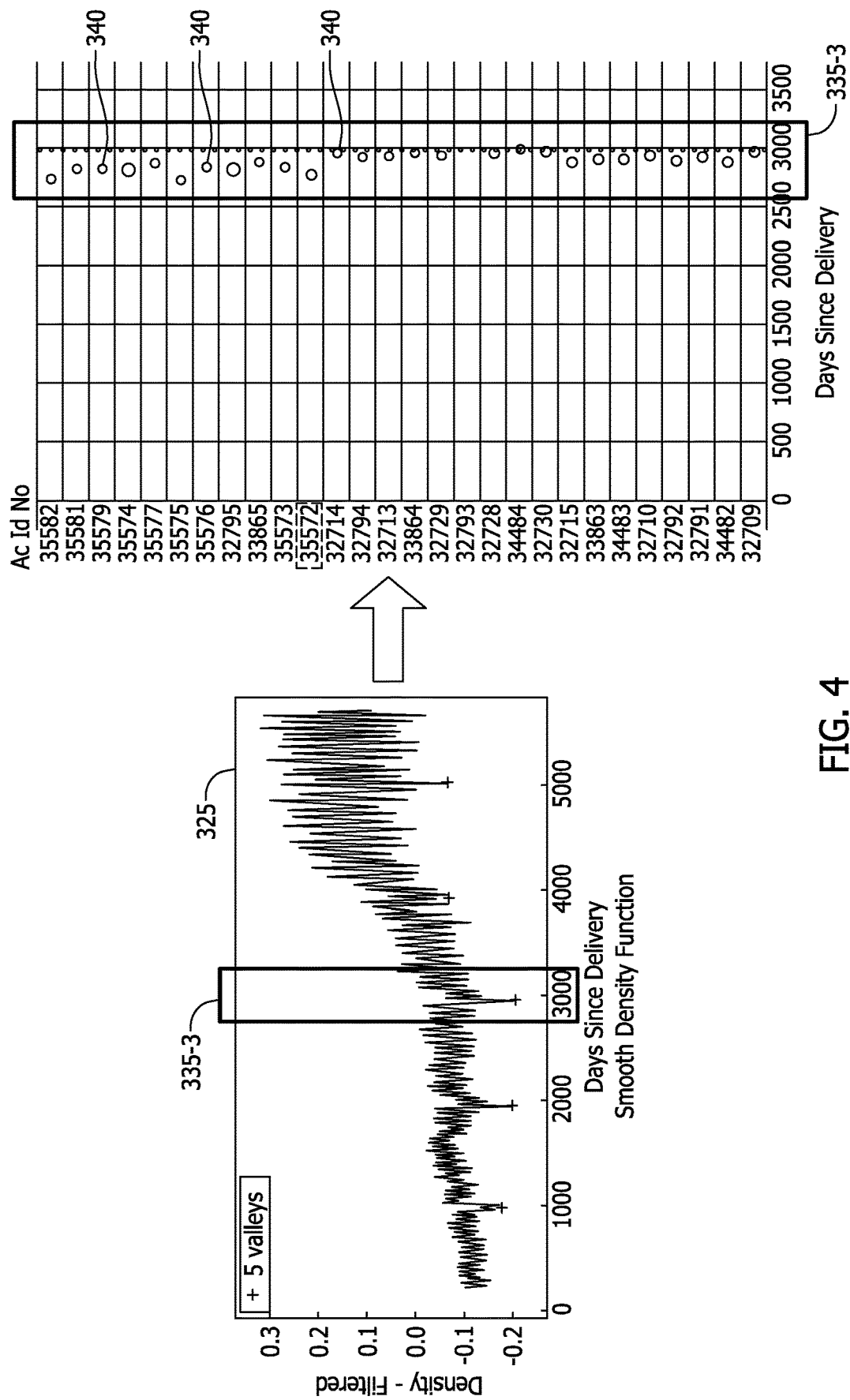
FIG. 4 illustrates a block diagram of comparing anchors to non-operational gaps in accordance with one embodiment of the disclosure.

FIG. 4 illustrates a block diagram of comparing anchor (such as 335-3) to non-operational gaps 340 in accordance with one embodiment of the disclosure. In the exemplary embodiment, for each of the anchors 335-1 through 335-5, the gaps 340 for each of the aircraft are analyzed to determine which gaps 340 are the closest to the corresponding anchor 335-1 through 335-5. The distance between each of the gaps 340 and the corresponding anchor 335-1 through 335-5 are measured and statistically analyzed to determine a confidence level that that anchor 335 represents a maintenance event.

As described above in FIGS. 1 through 4, in the exemplary embodiment, the MA server 510 receives a plurality of flight leg data 105 from a plurality of aircraft in a fleet or associated with an individual carrier. The MA server 510 analyzes the flight leg data 105 to determine which days each individual aircraft was operational and which days it was non-operational. The MA server 510 calculates the days relative to the aircraft's in-service or delivery date. The MA server 510 uses the data to detect non-operational gaps, where the aircraft was out of service for more than a predetermined period of days. For example, the predetermined period of days may be 11 to account for the heavy maintenance events than may take two weeks to complete.

The MA server 510 then uses a density function on the flight leg data 105 for all of the aircraft combined to calculate one or more anchors 335-1 through 335-5. Anchors 335-1 through 335-5 represent a significant number of the aircraft for the carrier were non-operational. The anchors 335-1 through 335-5 are also calculated based on the number of days from the aircraft's delivery date. The MA server 510 compares the non-operational gaps to the one or more anchors to determine whether or not each anchor represents a maintenance event. Using the maintenance events, the MA server 510 is capable of determining when the carrier performs maintenance on aircraft. The MA server 510 may then calculate when a future maintenance event is to take place for a specific aircraft. Based on the future maintenance event, the MA server 510 may determine one or more parts that may be necessary for the maintenance event and pre-order those parts to prepare for the maintenance event. The MA server 510 may also ship the one or more parts to the nearest region to where the maintenance event is predicted to take place. For example, if the carrier is based out of Malaysia, then the MA server 510 may ensure that the maintenance facilities near Malaysia have sufficient parts to cover the one or more parts that will be needed for maintenance and orders those parts to be shipped to one of the maintenance facilities if needed.

Figure 5:
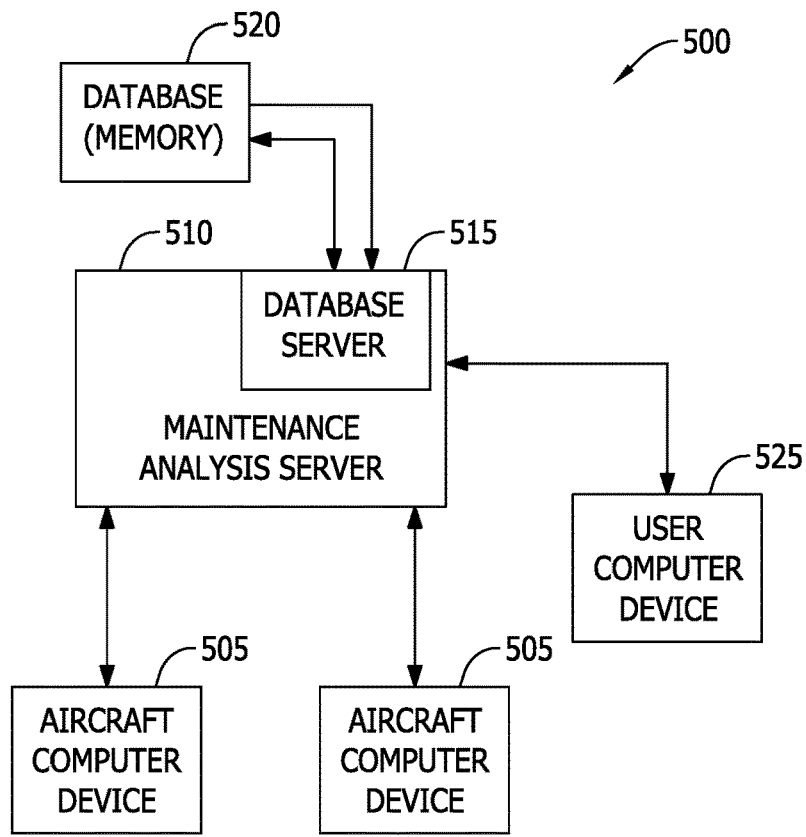
FIG. 5 illustrates a simplified block diagram of an exemplary maintenance analysis system for analyzing flight data for potential maintenance events.

FIG. 5 depicts a simplified block diagram of an exemplary system 500 for analyzing maintenance patterns of aircraft. In the exemplary embodiment, system 500 may be used for determining maintenance patterns and future maintenance events of aircraft. As described below in more detail, a maintenance analysis ("MA") server 510 (also known as a MA computer device 510), may be configured to (i) receive a plurality of aircraft flight leg data associated with a plurality of aircraft and (ii) determine one or more non-operational gaps for each aircraft. The non-operational gap represents a series of consecutive non-operating days for the aircraft. The MA server 510 may further be configured to (iii) compare the one or more non-operational gaps for the plurality of aircraft based on each aircraft's corresponding in-service date, (iv) detect a plurality of anchors in the plurality of aircraft flight leg data, (v) compare the one or more non-operational gaps for the plurality of aircraft to the plurality of anchors, and (vi) determine a future maintenance event for a first aircraft based on the comparison In the exemplary embodiment, aircraft computer devices 505 are computers that are associated with aircraft that report aircraft conditions. In some embodiments, the aircraft computer devices 505 report conditions in real-time. For example, an aircraft computer device 505 may report engine operating conditions, such as operating time, revolutions per minute, airspeed, start-up and/or shutdown logs, and/or any other data required to monitor the operation of the engine. Aircraft manufacturers may use this information to improve designs and lifecycles of aircraft. In the exemplary embodiment, aircraft computer devices 505 include a web browser or a software application, which enables aircraft computer devices 505 to access remote computer devices, such as MA server 510, using the Internet or other network. More specifically, aircraft computer devices 505 is communicatively coupled to MA server 510 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Aircraft computer devices 505 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, aircraft computer devices 505 are configured to transmit operational data to be stored in a database 520 for later use, such as described herein.

In the exemplary embodiment, user computer devices 525 are computers that include a web browser or a software application, which enables user computer devices 525 to access remote computer devices, such as MA server 510, using the Internet or other network. More specifically, user computer devices 525 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 525 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 515 is communicatively coupled to a database 520 that stores data. In one embodiment, database 520 may include aircraft operational data, flight leg data, airplane data, detected past maintenance events, and predicted future aircraft maintenance events. In the exemplary embodiment, database 520 is stored remotely from MA server 510. In some embodiments, database 520 is decentralized. In the exemplary embodiment, may access database 520 via user computer device 525 by logging onto MA server 510, as described herein. MA server 510 may be in communication with a plurality of aircraft computer devices 505 and a plurality of user computer devices 525 to analyze aircraft maintenance data.

Figure 6:
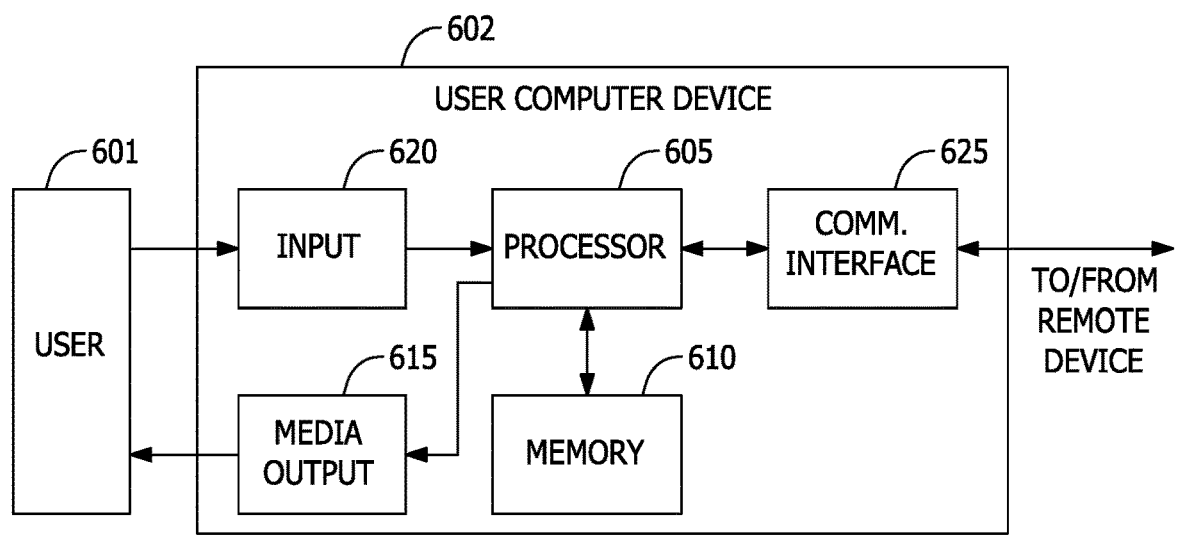
FIG. 6 illustrates an exemplary configuration of a client computer device as shown in FIG. 5, in accordance with one embodiment of the present disclosure.

FIG. 6 depicts an exemplary configuration of client computer device, in accordance with one embodiment of the present disclosure. User computer device 602 may be operated by a user 601. User computer device 602 may include, but is not limited to, aircraft computer devices 505 and user computer devices 525 (both shown in FIG. 5). User computer device 602 may include a processor 605 for executing instructions. In some embodiments, executable instructions may be stored in a memory area 610. Processor 605 may include one or more processing units (e.g., in a multi-core configuration). Memory area 610 may be any device allowing information such as executable instructions and/or transaction data to be stored and retrieved. Memory area 610 may include one or more computer readable media.

User computer device 602 may also include at least one media output component 615 for presenting information to user 601. Media output component 615 may be any component capable of conveying information to user 601. In some embodiments, media output component 615 may include an output adapter (not shown) such as a video adapter and/or an audio adapter. An output adapter may be operatively coupled to processor 605 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 615 may be configured to present a graphical user interface (e.g., a web browser and/or a client application) to user 601. A graphical user interface may include, for example, an interface for viewing detected or predicted maintenance events. In some embodiments, user computer device 602 may include an input device 620 for receiving input from user 601. User 601 may use input device 620 to, without limitation, select an aircraft or aircraft type review.

Input device 620 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 615 and input device 620.

User computer device 602 may also include a communication interface 625, communicatively coupled to a remote device such as MA server 510 (shown in FIG. 5). Communication interface 625 may include, for example, a wired or wireless network adapter and/or a wireless data transceiver for use with a mobile telecommunications network.

Stored in memory area 610 are, for example, computer readable instructions for providing a user interface to user 601 via media output component 615 and, optionally, receiving and processing input from input device 620. A user interface may include, among other possibilities, a web browser and/or a client application. Web browsers enable users, such as user 601, to display and interact with media and other information typically embedded on a web page or a website from MA server 510. A client application may allow user 601 to interact with, for example, MA server 510. For example, instructions may be stored by a cloud service, and the output of the execution of the instructions sent to the media output component 615.

Figure 7:
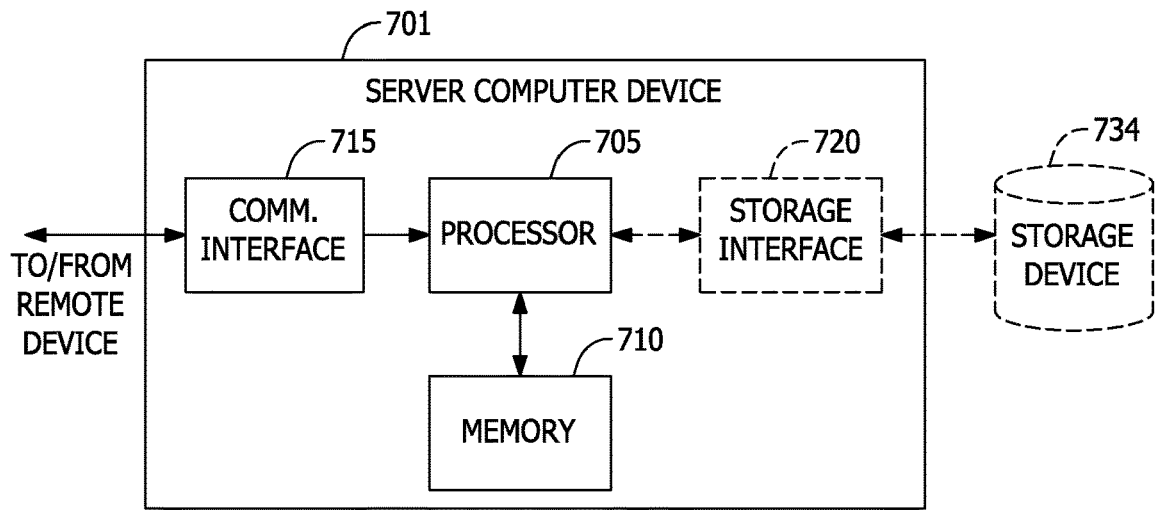
FIG. 7 illustrates an exemplary configuration of a server system as shown in FIG. 5, in accordance with one embodiment of the present disclosure.

FIG. 7 depicts an exemplary configuration of server system, in accordance with one embodiment of the present disclosure. Server computer device 701 may include, but is not limited to, MA server 510 and database server 515 (both shown in FIG. 5). Server computer device 701 may also include a processor 705 for executing instructions. Instructions may be stored in a memory area 710. Processor 705 may include one or more processing units (e.g., in a multi-core configuration).

Processor 705 may be operatively coupled to a communication interface 715 such that server computer device 701 is capable of communicating with a remote device such as another server computer device 701, MA server 510, aircraft computer device 505, and user computer device 525 (both shown in FIG. 5) (for example, using wireless communication or data transmission over one or more radio links or digital communication channels). For example, communication interface 715 may receive requests from user computer devices 525 via the Internet, as illustrated in FIG. 5.

Processor 705 may also be operatively coupled to a storage device 734. Storage device 734 may be any computer-operated hardware suitable for storing and/or retrieving data, such as, but not limited to, data associated with database 520 (shown in FIG. 5). In some embodiments, storage device 734 may be integrated in server computer device 701. For example, server computer device 701 may include one or more hard disk drives as storage device 734.

In other embodiments, storage device 734 may be external to server computer device 701 and may be accessed by a plurality of server computer devices 701. For example, storage device 734 may include a storage area network (SAN), a network attached storage (NAS) system, and/or multiple storage units such as hard disks and/or solid state disks in a redundant array of inexpensive disks (RAID) configuration.

In some embodiments, processor 705 may be operatively coupled to storage device 734 via a storage interface 720. Storage interface 720 may be any component capable of providing processor 705 with access to storage device 734. Storage interface 720 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 734.

Processor 705 may execute computer-executable instructions for implementing aspects of the disclosure. In some embodiments, the processor 705 may be transformed into a special purpose microprocessor by executing computer-executable instructions or by otherwise being programmed. For example, the processor 705 may be programmed with the instructions, such as those shown in FIG. 8.

Figure 8:
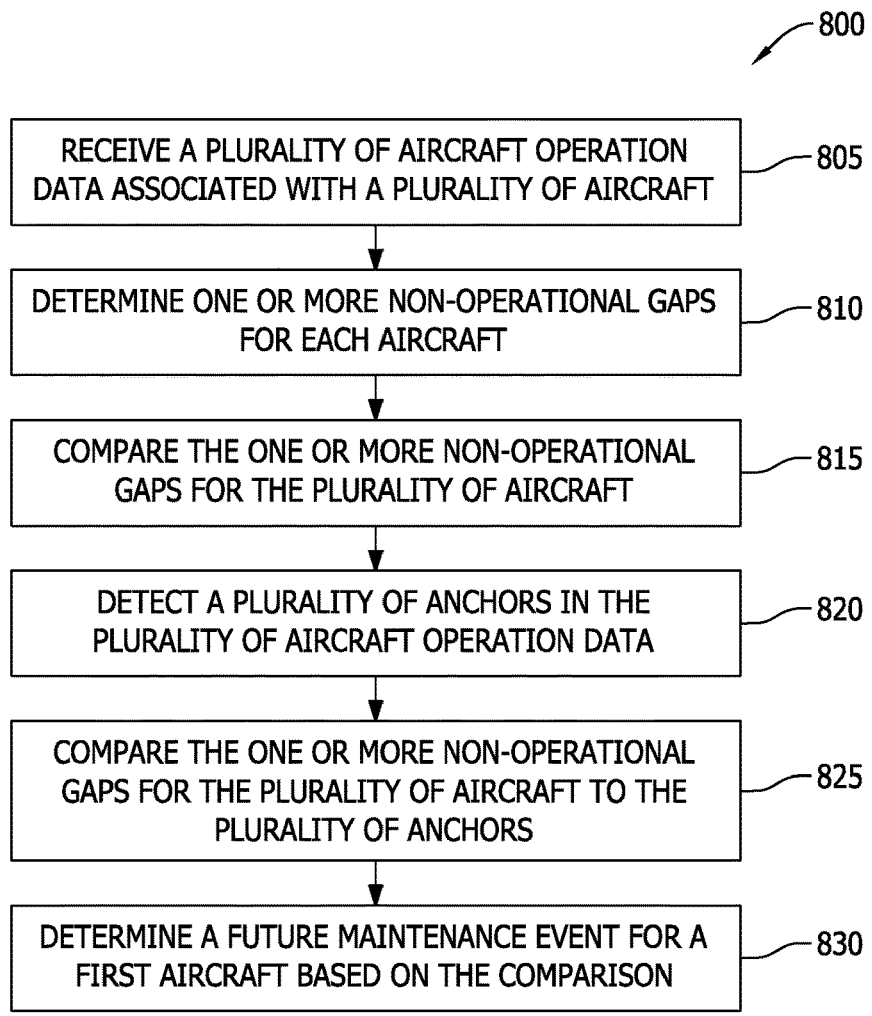
FIG. 8 illustrates a flow chart of a process for analyzing flight data for potential maintenance events as shown in FIGS. 1 to 4 using the maintenance analysis system shown in FIG. 5.

FIG. 8 illustrates a flow chart of a process 800 for analyzing flight data for potential maintenance events as shown in FIGS. 1 to 4 using the maintenance analysis system 500 shown in FIG. 5. In the exemplary embodiment, process 800 is performed by MA server 510 (shown in FIG. 5).

In the exemplary embodiment, MA server 510 receives 805 a plurality of aircraft flight leg data associated with a plurality of aircraft. This plurality of aircraft flight leg data includes aircraft flight data and airplane data 110 (shown in FIG. 1) including aircraft identifier number and in-service date for each of the plurality of aircraft included in the aircraft flight leg data. In some embodiments, the aircraft flight data is also known as flight leg data 105 (shown in FIG. 1). In the exemplary embodiment, aircraft flight data includes information about the operation of each aircraft. This may include data that is captured by one or more sensors aboard the corresponding aircraft, such as, but is not limited to, start-up time, start-up sequence logs, shutdown time, shutdown sequence logs, flight speed, engine speed, engine revolutions per minute, engine vibration, and/or data from the aircraft's avionics. In some embodiments, the aircraft transmits messages with some or all of this data directly to the aircraft manufacturer or other group associated with the MA server 510. In other embodiments, this may be data collected from public sources, such as public flight databases. In the exemplary embodiment, the airplane data 110 includes information about each individual aircraft in the plurality of aircraft, such as, but not limited to, aircraft delivery date or in-service date (the date that the individual aircraft began service), aircraft serial number, aircraft model, aircraft geographic region, and/or any other information about the individual aircraft used to perform the steps described herein. In some embodiments, MA server 510 filters the plurality of aircraft flight leg data by type or model of aircraft.

In the exemplary embodiment, MA server 510 determines 810 one or more non-operational gaps for each aircraft. A non-operational gap represents a series of consecutive non-operating days for the aircraft. In the exemplary embodiment, MA server 510 compares 815 the one or more non-operational gaps for the plurality of aircraft based on each aircraft's corresponding in-service date. In some embodiments, MA server 510 determines a plurality of operational days and a plurality of non-operational days for each aircraft of the plurality of aircraft based on the aircraft flight leg data. For each aircraft, MA server 510 determines one or more non-operations gaps based on the plurality of operational days and the plurality of non-operational days. In some further embodiments, MA server 510 determines a non-operational gap when a number of serial consecutive non-operational days exceeds a predetermined threshold, such as 11 days.

In the exemplary embodiment, MA server 510 detects 820 a plurality of anchors in the plurality of aircraft flight leg data. In some embodiments, MA server 510 detects 820 the plurality of anchors based on a smoothed density function comparing for time t a number of aircraft that flew at time t to a total of number of aircraft. In these embodiments, MA server 510 calculates the number of aircraft that were operational for each day since the aircraft's in-service or delivery date and compares that number to the total number of aircraft in the plurality of aircraft flight leg data for that day.

In the exemplary embodiment, MA server 510 compares 825 the one or more non-operational gaps for the plurality of aircraft to the plurality of anchors. In the exemplary embodiment, for each anchor, MA server 510 compares 825 the nearest non-operational gap for each of the plurality of aircraft to that anchor. In some embodiments, MA server 510 measures the distance between each of the nearest non-operational gaps and does statistical analysis to determine whether or not that is a potential maintenance event.

Using the comparisons and the statistical analysis, MA server 510 determine one or more past maintenance events for the first aircraft of the plurality of aircraft based on the one or more non-operational gaps associated with the first aircraft. In some further embodiments, MA server 510 determines a maintenance interval based on the comparison of the one or more non-operational gaps and the plurality of anchors.

In the exemplary embodiment, MA server 510 determines 830 a future maintenance event for a first aircraft based on the comparison. In some embodiments, MA server 510 determines 830 a future maintenance event based on the past maintenance events for the first aircraft and the determined maintenance interval. In other embodiments, the MA server 510 determines on which days after the aircraft's in-service date the carrier is most likely to perform maintenance and then compares that to the present date.

In some embodiments, MA server 510 determines one or more parts for a future maintenance event for the first aircraft and a required lead-time for the one or more parts to arrive. In some further embodiments, MA server 510 transmits an order for the one or more parts for the future maintenance event based on the required lead-time.

At least one of the technical solutions to the technical problems provided by this system may include: (i) improving the accuracy of determining when different airlines and/or fleets perform maintenance operations; (ii) efficiently analyzing data from hundreds to thousands of aircraft; (iii) efficiently handling different inspection logic from different carriers; (iv) determining and predicting maintenance events based on limited data; (v) predicting and preparing for maintenance events; and (vi) reducing the time and thereby the cost of performing maintenance by ensuring both the technical expertise and the parts are available when the maintenance event takes place.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As described above, the described embodiments enable analysis of flight data to detect maintenance events. More particularly, the present disclosure is directed to for discovering when and how often airline operators ("carriers") perform aircraft heavy maintenance events. More specifically, a maintenance analysis server is configured to analysis flight data from a plurality of aircraft to predict when those aircraft will have to perform maintenance events and be able to have the parts and labor ready for those maintenance events.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for analysis of flight data to detect maintenance events. The system and methods described herein address that technical problem. The technical effect of the systems and processes described herein is achieved by performing at least one of the following steps: (a) receiving, at the MA computer device, a plurality of aircraft flight leg data associated with a plurality of aircraft; (b) determining, by the MA computer device, one or more non-operational gaps for each aircraft, where a non-operational gap represents a series of consecutive non-operating days for the aircraft; (c) comparing, by the MA computer device, the one or more non-operational gaps for the plurality of aircraft based on each aircraft's corresponding in-service date; (d) detecting, by the MA computer device, a plurality of anchors in the plurality of aircraft flight leg data; (e) comparing, by the MA computer device, the one or more non-operational gaps for the plurality of aircraft to the plurality of anchors; and (f) determining, by the MA computer device, a future maintenance event for a first aircraft based on the comparison. The resulting technical effect is analysis of flight data to detect maintenance events to predict when and where to order parts.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer device comprising:
   at least one memory; and
   at least one processor in communication with said at least one memory, said at least one processor programmed to:
   receive a plurality of aircraft flight leg data associated with a plurality of aircraft;
   determine one or more non-operational gaps for each aircraft, wherein a non-operational gap represents a series of consecutive non-operating days for the aircraft;
   compare the one or more non-operational gaps for the plurality of aircraft based on each aircraft's corresponding in-service date;
   detect a plurality of anchors in the plurality of aircraft flight leg data;
   compare the one or more non-operational gaps for the plurality of aircraft to the plurality of anchors; and
   determine a future maintenance event for a first aircraft based on the comparison.

2. The device of claim 1, wherein the plurality of aircraft flight leg data includes airplane data including an aircraft identifier number and in-service date for each of the plurality of aircraft included in the aircraft flight leg data.

3. The device of claim 2, wherein the aircraft flight leg data is captured by one or more sensors aboard the corresponding aircraft.

4. The device of claim 1, wherein the at least one processor is further programmed to filter the plurality of aircraft flight leg data by type of aircraft.

5. The device of claim 1, wherein the at least one processor is further programmed to:
   determine a plurality of operational days and a plurality of non-operational days for each aircraft of the plurality of aircraft based on the aircraft flight leg data; and
   for each aircraft, determine one or more non-operations gaps based on the plurality of operational days and the plurality of non-operational days.

6. The device of claim 5, wherein the at least one processor is further programmed to determine a non-operational gap when a number of serial consecutive non-operational days exceeds a predetermined threshold.

7. The device of claim 1, wherein the at least one processor is further programmed to detect the plurality of anchors based on a smoothed density function of a comparison for time t of a number of aircraft departures at time t to a total of number of aircraft.

8. The device of claim 1, wherein the at least one processor is further programmed to determine one or more past maintenance events for the first aircraft of the plurality of aircraft based on the one or more non-operational gaps for the first aircraft.

9. The device of claim 1, wherein the at least one processor is further programmed to determine a maintenance interval based on the comparison of the one or more non-operational gaps and the plurality of anchors.

10. The device of claim 1, wherein the at least one processor is further programmed to determine one or more parts for a future maintenance event for the first aircraft and a required lead-time for the one or more parts to arrive.

11. The device of claim 10, wherein the at least one processor is further programmed to transmit an order for the one or more parts for the future maintenance event based on the required lead-time.

12. A computer implemented method for discovering when and how often airline operators ("carriers") perform aircraft heavy maintenance events, the method implemented on a maintenance analysis (MA) computer device including at least one processor in communication with at least one memory device, the method comprising:
   receiving, at the MA computer device, a plurality of aircraft flight leg data associated with a plurality of aircraft;
   determining, by the MA computer device, one or more non-operational gaps for each aircraft, wherein a non-operational gap represents a series of consecutive non-operating days for the aircraft;
   comparing, by the MA computer device, the one or more non-operational gaps for the plurality of aircraft based on each aircraft's corresponding in-service date;
   detecting, by the MA computer device, a plurality of anchors in the plurality of aircraft flight leg data;
   comparing, by the MA computer device, the one or more non-operational gaps for the plurality of aircraft to the plurality of anchors; and
   determining, by the MA computer device, a future maintenance event for a first aircraft based on the comparison.

13. The method of claim 12, wherein the plurality of aircraft leg data includes airplane data including an aircraft identifier number and in-service date for each of the plurality of aircraft included in the aircraft flight leg data, and wherein the aircraft flight leg data is captured by one or more sensors aboard the corresponding aircraft.

14. The method of claim 12 further comprising filtering the plurality of aircraft flight leg data by type of aircraft.

15. The method of claim 12 further comprising:
   determining a plurality of operational days and a plurality of non-operational days for each aircraft of the plurality of aircraft based on the aircraft flight leg data; and
   for each aircraft, determining one or more non-operations gaps based on the plurality of operational days and the plurality of non-operational days based on a number of serial consecutive non-operational days that exceeds a predetermined threshold.

16. The method of claim 12 further comprising detecting the plurality of anchors based on a smoothed density function of a comparison for time t of a number of aircraft departures at time t to a total of number of aircraft.

17. The method of claim 12 further comprising determining one or more past maintenance events for the first aircraft of the plurality of aircraft based on the one or more non-operational gaps for the first aircraft.

18. The method of claim 12 further comprising determining a maintenance interval based on the comparison of the one or more non-operational gaps and the plurality of anchors.

19. The method of claim 12 further comprising:
   determining one or more parts for a future maintenance event for the first aircraft and a required lead-time for the one or more parts to arrive; and
   transmitting an order for the one or more parts for the future maintenance event based on the required lead-time.

20. At least one non-transitory computer-readable storage media having computer-executable instructions embodied thereon, when executed by at least one processor, the computer-executable instructions cause the at least one processor to:
   receive a plurality of aircraft flight leg data associated with a plurality of aircraft;

determine one or more non-operational gaps for each aircraft, wherein a non-operational gap represents a series of consecutive non-operating days for the aircraft;

compare the one or more non-operational gaps for the plurality of aircraft based on each aircraft's corresponding in-service date;

detect a plurality of anchors in the plurality of aircraft flight leg data;

compare the one or more non-operational gaps for the plurality of aircraft to the plurality of anchors; and determine a future maintenance event for a first aircraft based on the comparison.

* * * * *